No. 833,122. PATENTED OCT. 9, 1906.
B. CAVALLINI.
FRAME FOR VEHICLE HOODS.
APPLICATION FILED SEPT. 13, 1904.
3 SHEETS—SHEET 1.
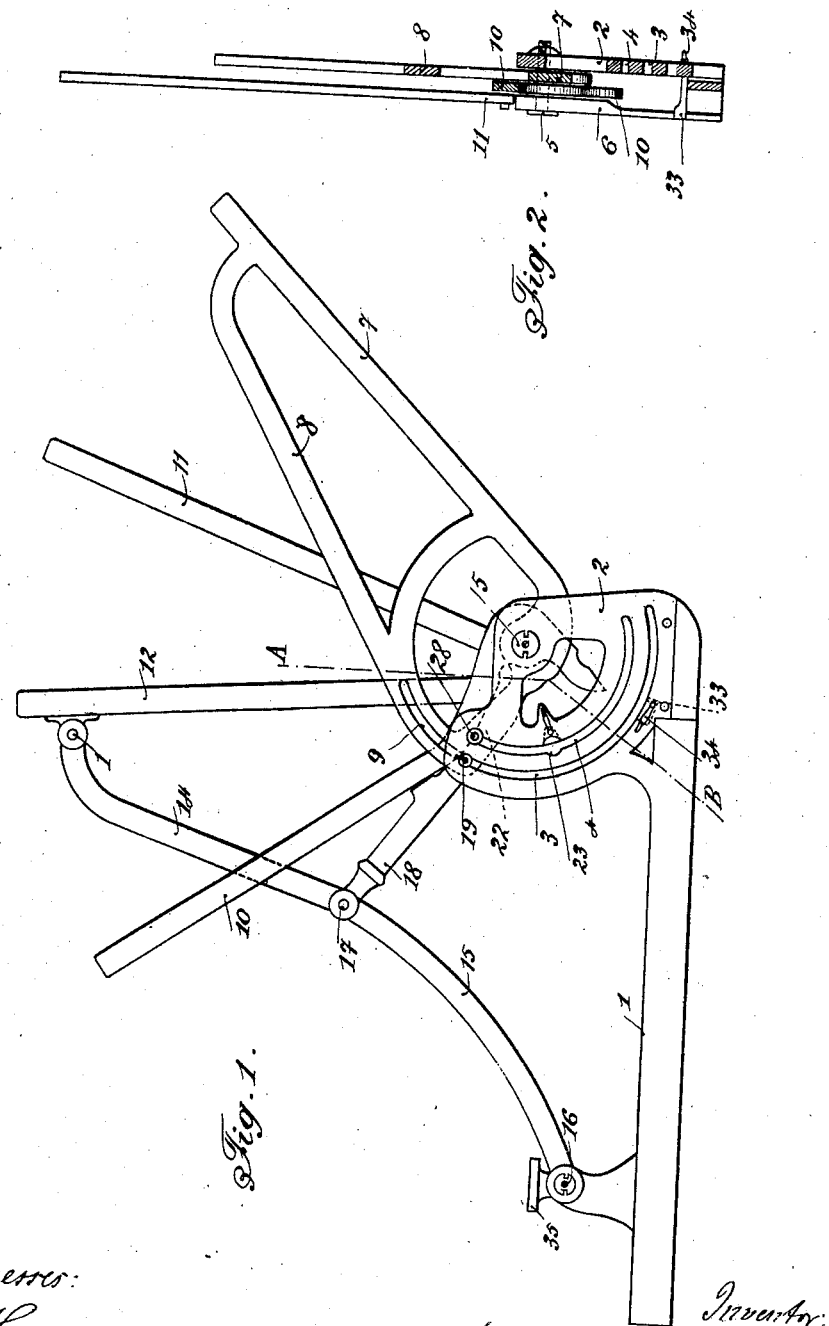

No. 833,122. PATENTED OCT. 9, 1906.
B. CAVALLINI.
FRAME FOR VEHICLE HOODS.
APPLICATION FILED SEPT. 13, 1904.
3 SHEETS—SHEET 2.
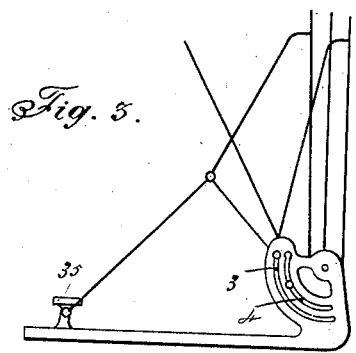
Fig. 3.
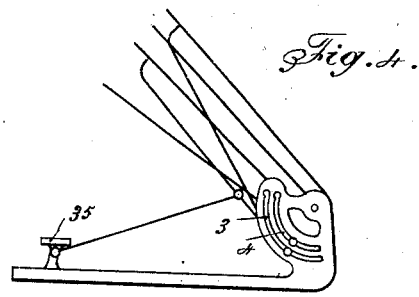
Fig. 4.
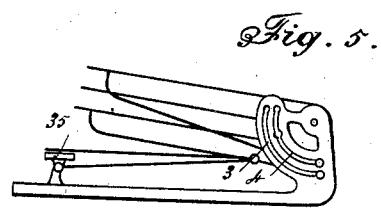
Fig. 5.
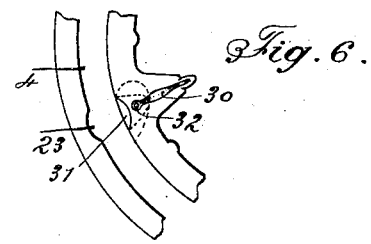
Fig. 6.
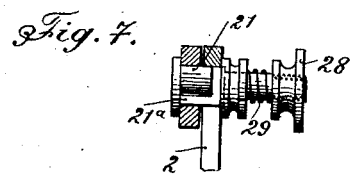
Fig. 7.
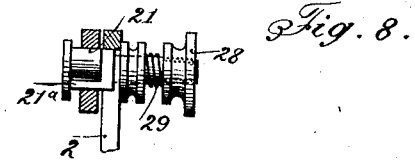
Fig. 8.
Fig. 9.
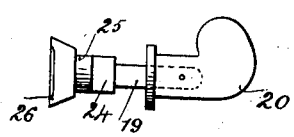
Fig. 10.
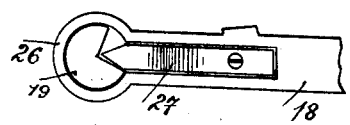
Witnesses:
Geo. Heinicke
Wm. A. Elliot
Inventor:
Bjrthe Cavallini
by G. Dittmar
Attorney
THE NORRIS PETERS CO., WASHINGTON, D. C.

No. 833,122. PATENTED OCT. 9, 1906.
B. CAVALLINI.
FRAME FOR VEHICLE HOODS.
APPLICATION FILED SEPT. 13, 1904.
3 SHEETS—SHEET 3.
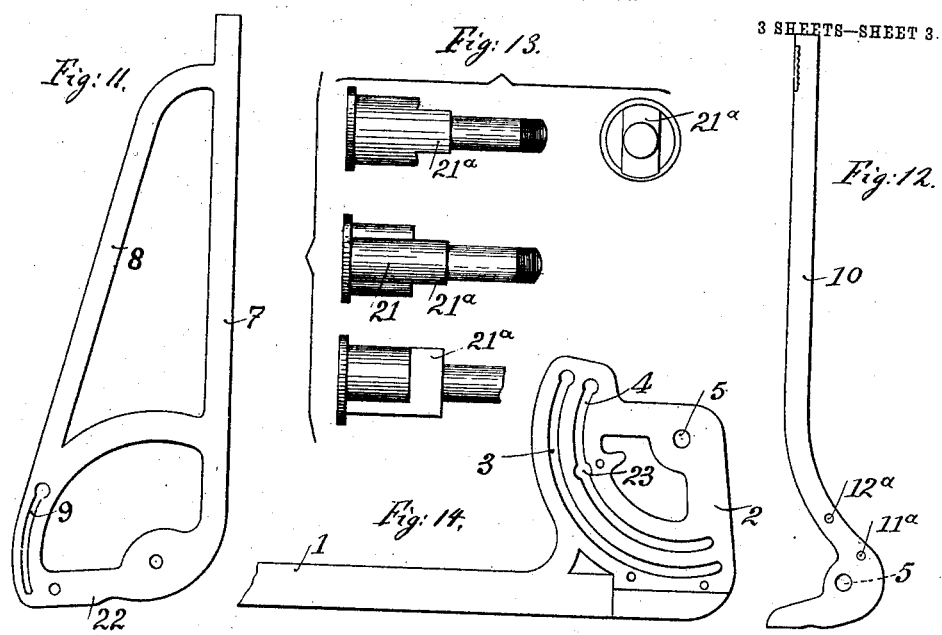
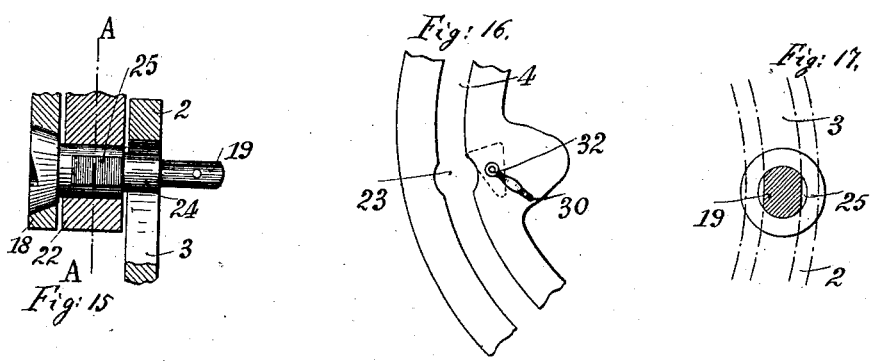
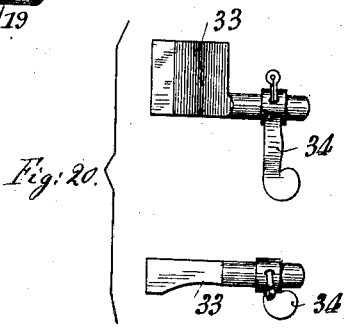

UNITED STATES PATENT OFFICE.

BERTHE CAVALLINI, OF LOMBEZ, FRANCE.

FRAME FOR VEHICLE-HOODS.

No. 833,122.

Specification of Letters Patent.

Patented Oct. 9, 1906.

Application filed September 13, 1904. Serial No. 224,337.

*To all whom it may concern:*

Be it known that I, BERTHE CAVALLINI, née BARRAU, a citizen of the French Republic, residing at Lombez, France, have invented certain new and useful Improvements in Frames for the Hoods of Vehicles and the Like, of which the following is a full, clear, and exact specification.

The present invention has reference to a frame for the hoods of vehicles which is attached to the vehicles in any suitable manner and which permits the hood to be opened to a variable extent, while assuring its being firmly held in any position. The device can, moreover, be easily operated from the inside of the carriage without there being any necessity to descend therefrom.

In the accompanying drawings, forming part of this specification, Figure 1 is a side elevation of the frame, showing it fully opened. Fig. 2 is an edge view, partly in section, following the line A B of Fig. 1. Figs. 3, 4, and 5 show diagrammatically the position of the arms of the frame corresponding to the different degrees of being closed. Figs. 6 to 20 are details of certain parts.

The device comprises a base 1 with standard 2, having circular slots 3 and 4 and carrying a pivot 5, forming the center of these slots. The standard 2, jointly with a plate 6, forms a casing, in the space of which are located the movable parts of the device, which will be hereinafter described.

The frame comprises four movable arms, which operate the hood. The arm 7, turning on the pivot 5, has a branch 8, which carries a slot 9, also circular and having the same radius and center as the slot 3. (See Figs. 1 and 11.) The arm 10, Figs. 1 and 12, has a lower enlarged part, turning also on pivot 5. To this arm 10 a third arm 11 is pivoted at 11ª, as shown in Figs. 2 and 12. A fourth arm 12 is pivoted to arm 10 in a similar manner, as at 12ª in Fig. 12. The arms 11 and 12 serve to maintain the hood stretched. At 13 a toggle-joint 14 15 is hinged to arm 12, and the lower end of the member 15 turns on a bolt 16, secured to the base 1. The two members 14 and 15 are connected at 17 to the end of a rod 18, the lower end of which is traversed by a bolt 19 of special form, Figs. 9 and 18, having an operating-key 20. This bolt when the system is in operation slides in the slot 3, while in the slot 4 slides another bolt 21, being inserted in the bent part 22 of the arm 7. The two slots 3 and 4 are at their upper ends rounded and broadened similar to a recess or notch, as shown at 23 in the slot 4. Similar notches are also made in the ends of the slot 9. The bolt 19 with handle 20 is flattened at 24 and 25 at right angles to each other in such a way that, according to the direction in which the key will be turned, the bolt may be able to move either in the slot 3 or in the slide 9—*i. e.*, when the broad part 24 is engaged in the notch of the slot 3 the narrow part 25 will stand in the slot 9, and, vice versa, when the broad part of 25 is in the notch the narrow part of 24 will be in the slot 3. In order to regulate this movement of the bolt 19 and to limit it, its head 26 (see Figs. 9 and 10) carries a triangular notch in which there is placed the pointed end of a spring 27, located in the thickness of the connecting-rod 18. This triangular notch may have a flat bottom, such as indicated in Figs. 9 and 10, or the middle portion may be raised, as shown in Figs. 15 and 18. In such case the pointed end of the spring 27 will rise when the bolt 19 is turned, while the middle portion passes under the spring, and in the end positions of said bolt the same will be held more safely against accidental turning.

The bolt 21, passing into the slot 4, traverses the bent arm 22 and enters the upper notch of the slot 4, filling the same out by its greater diameter; but on pressing the button 28, screwed upon the shank of bolt 21 and actuated by a spring 29, the bolt is pushed back, and its flattened portion 21ª, which comes into the slot 4, renders it then possible by pushing blade 7 to bring the device into the position shown in Fig. 3. The other blades 10 11 12, the cross-link 18, and the two arms 14 and 15 obey the movement. According to the direction in which the bolt 19 will be turned in the slides 3 and 9, the lowering of the frame will be partial or total. Furthermore, the notch 23 can admit of the free passage of the bolt 21 or hold it there under the action of the spring 29. In order to give free passage to the bolt at this point, it is sufficient to turn in a suitable direction a small key 30, Figs. 1, 6, and 16, formed in one piece with a cam 31 sunk in the thickness of the head 2 and adapted to turn on a pivot 32. Then the said cam should partly cover the notch 23 of the inner side in order that the enlarged part 21ª of the axis 21 may not penetrate therein. In this case and upon the condition that the axis 19 be suitably turned the arrangement can be adjusted so as to be at last lowered into the position shown in Fig. 4. In the lower part of the slide 3 there is also arranged a stop 33, operated by a key 34 similar to the key 30. This stop in its raised position will also form a stop to the passage of the bent arm 22 of the blade 7 and will limit the lowering of the frame to the position shown in Fig. 4; but when this stop is turned down the bent branch 22 will have free passage and the frame can be completely lowered, as indicated in Fig. 5, the blade 10 then coming to rest upon a support 35 of the mounting.

Let us examine the operation, and let us assume that the hood be closed. If it be desired to raise it, it is sufficient to take the first blade 7 and push it forward to the front by taking a hold on both sides of the carriage until the bolt 21 arrives in the upper notch of the slot 4. This is the only operation required. In order to lower the hood, it is only necessary to press the button 28 of the bolt and to slightly push the first blade backward in order to obtain the release on one side. This operation is then repeated on the other side, whereupon the hood will go down. The different blades have their support upon the wall 6, and thus give a fixed position to the hood, the blade 10 of which will, moreover, rest on the stop 35. If it be desired merely to only partly turn the hood down, the two first blades can be lowered, while the others remain in place. To this end it is only necessary to turn the handle 20 inwardly so that its flat sides are in a horizontal plane. Then the key 30 is turned into the position Fig. 6, and finally press the button 28 and bear lightly on the first blade in order to release successively both sides, and then raise the blade entirely and press with the hands on each side until the bolt 21 snaps into the second notch. When it is desired to change the position, it will be sufficient to press the button 28 and to return the first blade into its former position by causing the bolt 21 to penetrate into the upper notch. Care must afterward be taken to raise the two first keys. Finally, if it be required to close two-thirds of the hood then turn the key 34 outward, the handle of which was below the second groove. Then proceed as has been described above for closing the hood.

Having thus described my invention, what I claim is—

1. A frame for movable carriage-hoods composed of a support and pivot for a number of blades carrying the canvas of the hood, said support having in one of its side cheeks circular slots, concentric to the pivot, said slots being provided with round notches at the ends and at a suitable distance from the ends, so that round pins traveling with flattened parts through the slots may be set fast in the notches of a number of blades pivoted to the support and of round pins inserted in said blades provided with flattened parts to either lock them with the blades in the slot-notches in different positions, or to allow them to travel through the slots substantially as described and for the purpose set forth.

2. A frame for movable carriage-hoods composed of a support and pivot for a number of blades carrying the canvas of the hood, said support having in one of its side cheeks circular slots, concentric to the pivot, said slots being provided with round notches at the ends and at a suitable distance from the ends so that round pins traveling with flattened parts through the slots may be set fast in the notches of a number of blades pivoted to the support and of round pins inserted in said blades provided with flattened parts to either lock them with the blades in the slot-notches in different positions or to allow them to travel through the slots, the first blade having a bend 22 and a side branch 8 with a slot 9 concentric to the pivot and in line with the outer slot of the support, provided with similar round notches at the ends so that a revoluble bolt inserted in the blade, being flattened in two places at right angles to each other, may be made to travel either in the slot 9 or in the outer slot of the support, substantially as described.

3. A frame for movable carriage-hoods composed of a support and pivot for a number of blades carrying the canvas of the hood, said support having in one of its side cheeks circular slots, concentric to the pivot, said slots being provided with round notches at the ends and at a suitable distance from the ends, so that round pins traveling with flattened parts through the slots may be set fast in the notches of a number of blades pivoted to the support and of round pins inserted in said blades provided with flattened parts to either lock them with the blades in the slot-notches in different positions or to allow them to travel through the slots of the blades being connected to the support by a toggle 14 15 with a link 18 having in its outer end a bolt 19 with flattened parts adjacent and at right angles to each other, traveling in the outer slot of the support substantially as described and for the purpose set forth.

In witness whereof I have hereunto set my hand in presence of two witnesses.

BERTHE CAVALLINI.

Witnesses:
ALEXANDER BEIROTH,
C. M. MOREAU.